US011556972B2

(12) United States Patent
Smith

(10) Patent No.: US 11,556,972 B2
(45) Date of Patent: Jan. 17, 2023

(54) METHOD OF IMPROVING EFFICIENCY OF ARENA CONCESSIONS

(71) Applicant: Jermaine Smith, Brandywine, MD (US)

(72) Inventor: Jermaine Smith, Brandywine, MD (US)

( * ) Notice: Subject to any disclaimer, the term of this patent is extended or adjusted under 35 U.S.C. 154(b) by 391 days.

(21) Appl. No.: 15/793,148

(22) Filed: Oct. 25, 2017

(65) Prior Publication Data

US 2019/0122287 A1    Apr. 25, 2019

(51) Int. Cl.
*G06Q 20/00* (2012.01)
*G06Q 30/06* (2012.01)
*G06Q 50/12* (2012.01)
*G06Q 20/32* (2012.01)
*G06Q 20/08* (2012.01)
*G06Q 20/12* (2012.01)

(52) U.S. Cl.
CPC ..... *G06Q 30/0633* (2013.01); *G06Q 20/0855* (2013.01); *G06Q 20/12* (2013.01); *G06Q 20/322* (2013.01); *G06Q 50/12* (2013.01)

(58) Field of Classification Search
CPC .......... G06Q 30/0633; G06Q 20/0855; G06Q 20/12; G06Q 50/12; G06Q 20/322
USPC ......................................................... 705/15
See application file for complete search history.

(56) References Cited

U.S. PATENT DOCUMENTS

| | | | |
|---|---|---|---|
| 2002/0038259 A1* | 3/2002 | Bergman | G06Q 20/322 705/27.1 |
| 2009/0281903 A1* | 11/2009 | Blatstein | G07G 1/0036 705/26.1 |
| 2016/0110781 A1* | 4/2016 | Bedel | H04W 4/02 705/26.1 |
| 2017/0336441 A1* | 11/2017 | Hosein | G06Q 30/0623 |

* cited by examiner

Primary Examiner — Russell S Glass
(74) Attorney, Agent, or Firm — H. Jay Spiegel

(57) ABSTRACT

A computer software application (APP) is programmed into a smartphone. The smartphone allows a user to access various concessions and facilitate ordering items such as food, beverages, souvenirs, and memorabilia. The APP allows the user to input their seat location so the vendor can locate the user to deliver what has been ordered. The APP includes information concerning the user. The concessionaires all have a communication device allowing them to receive orders from users and to fulfill them.

15 Claims, 3 Drawing Sheets

METHOD OF IMPROVING EFFICIENCY OF ARENA CONCESSIONS

BACKGROUND OF THE INVENTION

The present invention relates to a method of improving efficiency of arena concessions. Live entertainment is a staple of the human experience. Arenas whether enclosed or open air or some combination of both are a common venue for viewing entertainment such as athletic events, concerts, other musical performances, plays and musicals, and other entertainment opportunities including vehicle-related events such as monster truck shows. Arenas and other venues where entertainment is provided typically include concessions where food, beverages, souvenirs, and memorabilia may be purchased.

Typically, such concessions are located at the periphery of the viewing area. Thus, in the case of an arena, typically there is a peripheral concourse where a variety of concessions may be accessed.

As explained above, concessions may include food, beverages, souvenirs, and memorabilia for sale. Each concession location may have a unique selection of such items. For example, one food concession might have a certain theme such as only Italian food, whereas another concession might include just Kosher food. Other concessions might solely include beverages including some with non-alcoholic beverages and others with alcoholic beverages or some combinations thereof.

Some souvenir stands might have souvenirs concerning a particular team, whereas others might have souvenirs for an entire league. Any possible combinations might be made available to purchase.

In the sports world, millions of customers attend live events at arenas and stadiums. For example, in 2015-16, in the NBA there were about 21 million live customers with an average arena attendance of 17,000 patrons for 30 teams. Each home venue held 41 contests besides playoff games. In the National Football League, there were 18 million customers spread among 32 teams and 8 home games besides pre-season games and playoff games. Average stadium attendance was about 70,000.

In the National Hockey League, in 2015-16, there were 22 million customers spread among 30 teams with each team hosting 41 games at an average attendance of 18,000. In Major League Baseball, the total number of customers in 2015-16 was 73 million spread among 30 teams with an average stadium attendance of 30,000 spread among 81 home games for each team. As should be clear, there are a lot of customers, just when one considers sporting events, for whom adding convenience and efficiency to arena concessions would be quite useful and attractive.

As entertainment events currently operate, a customer or patron who wants to obtain something from a concession must leave their seat, walk a long distance including perhaps up some steep stairs, stand in a long line, purchase what they wish to purchase, pay for it using cash typically, and then carry what they have purchased back to their seat. While all of this is going on, the customer or patron has missed a portion of a concert, sporting event, play, musical, etc. As such, it would be advantageous if a method were provided that would allow the customer or patron to obtain what they want to obtain from a concession without having to miss any of the action from their seat by leaving their seat. It is with these thoughts in mind that the present invention was developed.

SUMMARY OF THE INVENTION

The present invention relates to a method of improving efficiency of arena concessions usable at an entertainment venue. The present invention includes the following inter-related objects, aspects and features:

(1) In a first aspect, the present invention includes a computer software application (APP) that is programmed into a module such as a smartphone or an electronic device that may be either mounted on a seat in an arena or portably associated with the seat.

(2) The module is designed to allow a user to access various concessions and facilitate ordering items such as food, beverages, souvenirs, and memorabilia.

(3) The APP includes a manner by which the user may input their seat number including the section so that the vendor can locate the user to deliver what has been ordered.

(4) A user who is new to the method registers by accessing an APP store, for example, on a communication module comprising a cellular device such as, for example, a smartphone, and downloads the APP to the cellular device. Alternatively, the APP is downloaded onto a communication module that the user may utilize within the arena either by renting it or having it supplied by the arena or the concessionaires. The APP, particularly when downloaded onto a user smartphone, includes information concerning the user such as name, address, telephone number, e-mail address, user name, password, a photograph of the user, payment information including one or more credit or debit cards, and any other information necessary to facilitate operation of the method.

(5) The concessionaires all have a communication device allowing them to receive orders from users via a central processing server and to fulfill them. Thus, for example, when a user desires to order one or more items from a concessionaire, the APP permits the user to determine which items are available at which concessionaires with the APP also determining which concessionaire having the desired items is closest to the location where the user is seated.

(6) The user creates an order and pushes a send button to cause the order to be transmitted through a centralized system within the arena, including the central processing server, which processes the order, locates the desired vendor, and transmits the order to the desired vendor. The vendor then processes the order and transmits the information concerning the completed order to a server (delivery person) who is to deliver the order as assigned by the central processing server. The order is picked up and delivered to the user.

(7) In the preferred embodiment of the present invention, no physical money changes hands during the entire process. When the order has been fulfilled, the credit or debit card that has been inputted into the system by the user is charged for the transaction. Provision may be made to add a tip to the payment if desired, including after delivery.

(8) In operating the inventive method, the efficiency of arena concessions is dramatically enhanced while the convenience to the user is significantly improved. A user may continue watching the entertainment they are watching from their seat and does not have to leave the seat to obtain any item they wish to obtain. The APP allows the user to determine all items sold by each concessionaire in the arena, to choose the concessionaire most convenient to their seat, order items, and have them delivered, and pay for them without having to bring any cash to the arena.

As such, it is a first object of the present invention to provide a method of improving efficiency of arena concessions.

It is a further object of the present invention to provide such a method in which an APP is downloaded and can be used to register users providing all of the appropriate information to identify users and provide forms of payment.

It is a still further object of the present invention to provide such a method in which concessionaires may be chosen through convenience and items may be ordered from such concessionaires within an arena.

It is a yet further object of the present invention to provide such a method in which payment can be made electronically without need to use cash.

It is a yet further object of the present invention to provide a method in which the user need not leave their seat while viewing entertainment and items may be purchased and delivered to the seat in an efficient manner.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
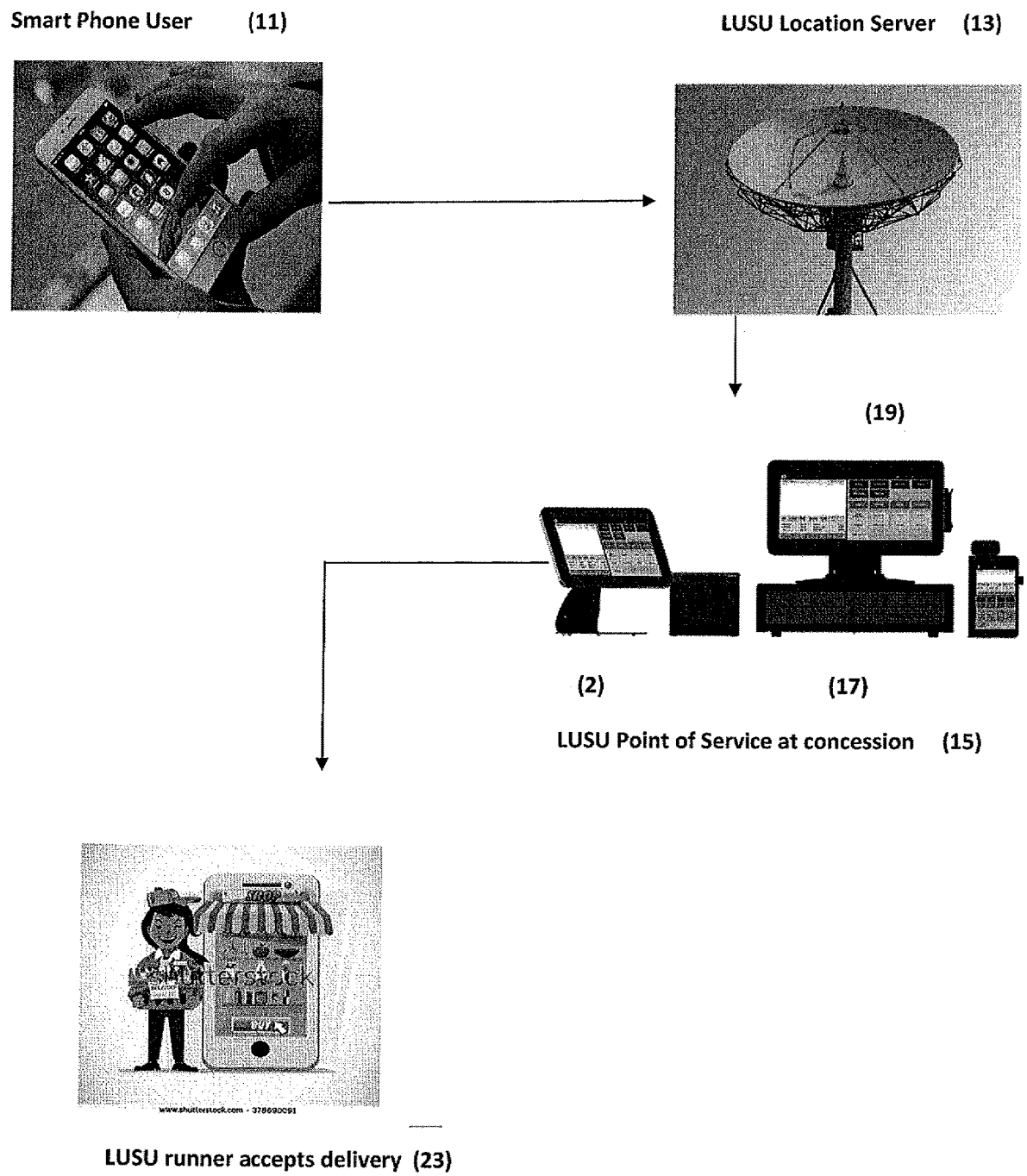
FIG. 1 shows a schematic overview of the hardware employed in practicing the inventive method.

Reference is first made to FIG. 1 which shows a schematic representation of the hardware employed in practicing the inventive method. The system is generally designated by the reference numeral 10 and is seen to include an ordering module 11 which may be a smartphone or other hand held computer, as well as a self-contained module either attached to an arena seat or portable and usable by a patron of the arena at the seat.

A central processing server 13 receives signals, preferably wirelessly, from the ordering module 11 concerning identification of a customer, their location in the arena, what they wish to order, and from which concessionaire they wish to order it. This information is saved in a computer memory and transmitted, preferably wirelessly, to a point of service device 15 at the location of a chosen concessionaire comprising a computer 17 with a display 19 and a printer 21. The requested order is processed by the chosen concessionaire and then via the point of service device 15, a server 23 (delivery person) is notified that an order is ready to be picked up and delivered to the customer. The server 23 comprising a delivery person is provided the order along with the location information for the customer so that the order may be delivered. A photograph of the customer (user) assists in identifying the customer.

Figure 2:
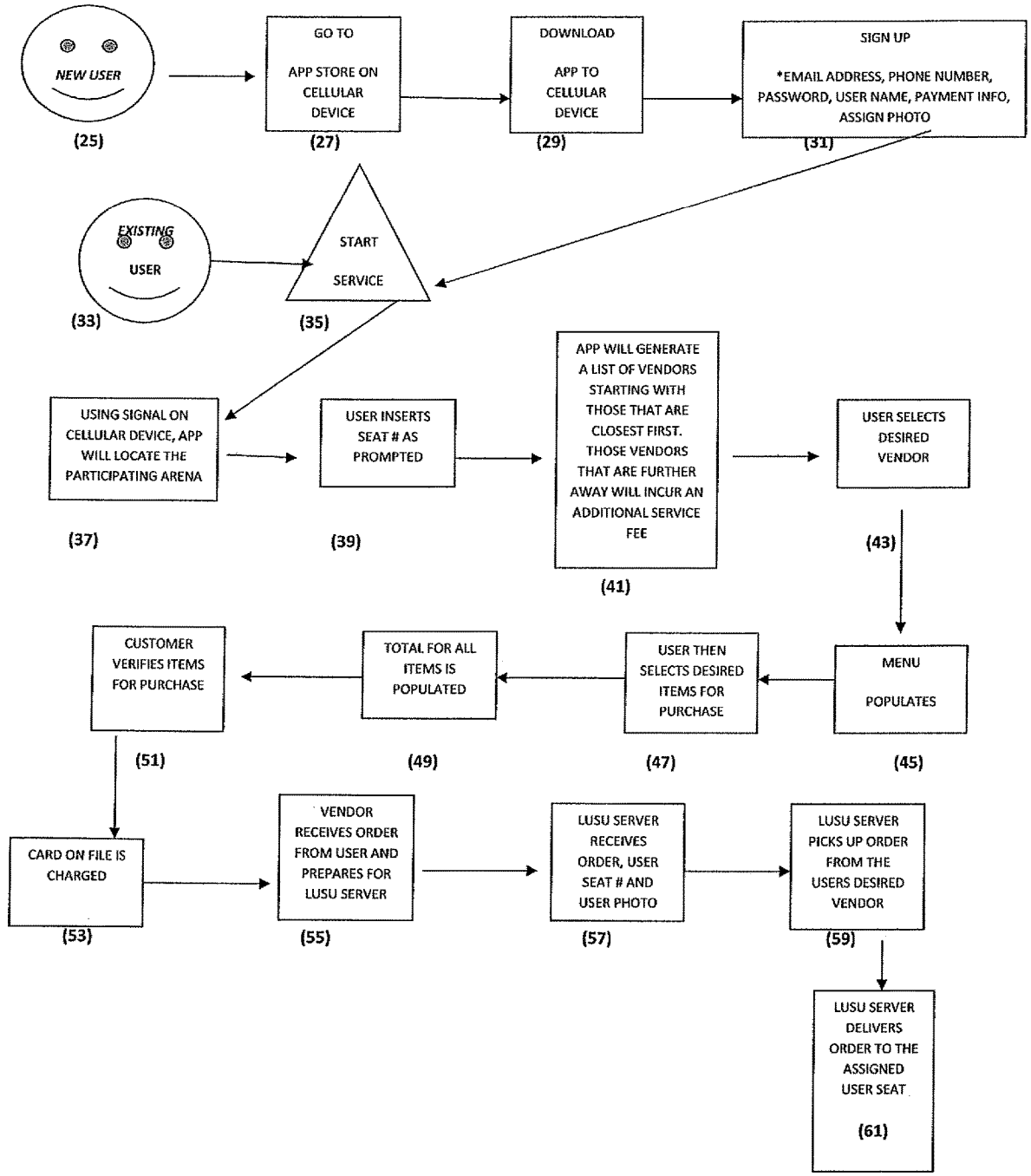
FIG. 2 shows a flowchart of operation of the inventive method from the perspective of the customer.

With reference now to FIG. 2, a flowchart is shown depicting the manner by which the inventive method is conducted. With reference to FIG. 2, a new user 25 must first register. As such, as shown at the box 27, the new user 25 visits an APP store on their cellular device and at 29 downloads the APP to their smartphone or other cellular device. In the case of an ordering module 11 that is not a smartphone or cellular device, the arena or other entity downloads the APP onto a portable module or a module mounted to each arena seat.

Once the APP is downloaded to the smartphone, cellular device or other ordering module, the user or customer is prompted to sign up for the service. The sign up process at the box 31 includes providing information including but not limited to the name, billing address, phone number, facsimile number, e-mail address, user name, password, credit card or debit card information, and a photograph of the user or customer to facilitate identifying the user when goods are delivered to their seat.

At this point, the new user 25 has become an existing user 33. The service is started at 35 with the user activating the APP on their smartphone, cellular phone, or other ordering module 11 (FIG. 1).

Once the service has commenced, the ordering module 11 will send a signal allowing the system to locate the particular arena or other venue where the module is located. This is shown at box 37. At box 39, the user inserts their section number and seat number at the particular venue when prompted to do so by the APP. Once this is done, as described at box 41, the APP will generate a list of vendors, not only by location, identifying those vendors or concessionaires closest to the inputted seat number but also providing a general description of the types of goods sold by the vendor or concessionaire. For example, the information might say "Food," "Beverages," "Food and Beverages," "Souvenirs," "Memorabilia," etc. The information may also be more specific within each category. For example, Italian Food, American-Style Food, Alcoholic Beverages, Alcoholic and Non-Alcoholic Beverages, Souvenirs concerning the Home Team, Souvenirs concerning Teams within the Home Team's League, etc.

At this point at box 43, the user selects the desired vendor and this results in populating (45) a menu or other listing of all of the goods sold by the vendor including pricing for each item. Quantity discounts, required taxes, and other information are also provided.

At box 47, the user or customer then selects which items they desire to purchase and at 49 a shopping cart is displayed listing all of the items to be purchased including the pricing per item and the total cost. At box 51, the customer verifies all of the items to be purchased, and the credit or debit card (53) is charged for the items purchased.

At this point, the point of service device 15 at the location of the chosen vendor receives the order (box 55) and prepares it for delivery. At box 57, it is noted that when the vendor or concessionaire receives the order from the user or customer, that order also includes the seat number and section number where the order is to be delivered as well as a photo of the user or customer for easy identification when the order is to be delivered.

Once the order has been completed, the point of service device 15 notifies the server 23 (delivery person) (see box 59) who picks up the order and at 61 delivers the order to the user or customer at their assigned seat.

Figure 3:
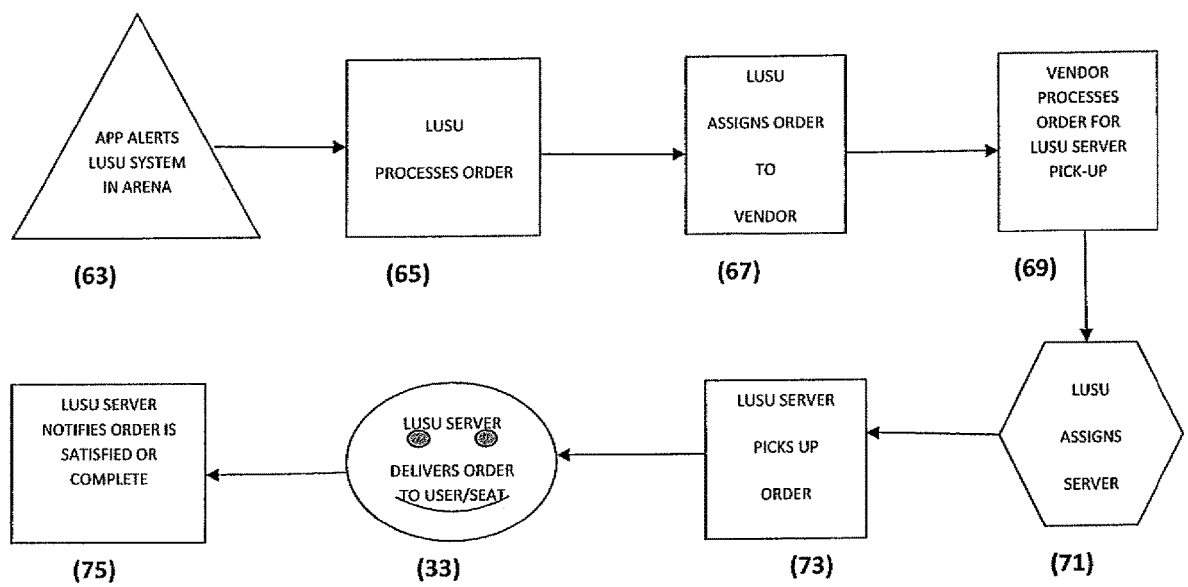
FIG. 3 shows a flowchart of the operation of the inventive method from the perspective of the concessionaire/server.

With reference now to FIG. 3, a flowchart is provided from the perspective of the vendor/concessionaire. As seen, the box 63 represents that the central processing server 13 within the arena or other venue has been alerted that an order is arriving. The order is processed by the central processing server 13 at the box 65 and is then assigned to the vendor/concessionaire (box 67) by transmitting it to the point of service device 15 at the location of the vendor/concessionaire. At box 69, the vendor/concessionaire processes the order and then notifies the server 23 (delivery person) for pickup. The server 23 is assigned at the box 71 and picks up the order at the box 73 and delivers the order to the existing user 33 at their seat, identifying them by the seat and section number and the photograph. Then, the central processing server 13 is notified (box 75) that the order has been satisfied or completed.

At this point, if desired, the APP can include being programmed so that the user/customer can provide a tip to the particular server who delivered the goods and, additionally upon prompting, a survey can be displayed allowing the user/customer to evaluate the service they received and provide that evaluation.

The inventive APP may also be associated with a website that permits a user to preset or select a venue where the user soon intends to be so that the user can receive concession information including item lists and menus before arriving at the venue. In this way, the user can pre-order items before arriving at the venue and set a delivery time at which the vendor can deliver the items to the user's seat without the user being required to be located at the venue when ordering.

In this way, enjoyment of an entertainment experience is significantly enhanced while vendors are provided a more convenient way to sell goods and generate revenue.

As such, an invention has been disclosed in terms of a preferred embodiment thereof, which fulfills each and every one of the objects of the present invention and provides a new and useful method of improving efficiency of arena concessions of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. A method of improving efficiency of arena concessions, including the steps of:
   a) providing a computer software application (APP) downloadable onto a communication module comprising a smartphone, said APP facilitating registering a user with identifying information for said user including name, contact information, manner of payment information, and an image of said user, and permitting said user to conveniently order goods from one or more of a plurality of vendors and have the goods delivered to a user location within an entertainment venue;
   b) providing a central processing server programmed to receive orders from said user which include user seat location within said entertainment venue, and process said orders from one or more of a plurality of vendors in or adjacent said entertainment venue, said central processing server including a wireless receiver for receiving orders, and a computer with a memory for saving and processing orders;
   c) providing a point of service device at a location of each said vendor, said point of service devices receiving orders from said central processing server and instructing a chosen said vendor to process said orders;
   d) providing a delivery service to deliver completed orders to said user; and
   e) said APP facilitating electronic payment by said user to said vendor for goods purchased by said user;
   f) a user activating a said smartphone which generates a list of vendors in the venue including identifying categories of vendors and within each category relative proximity of said vendors to said seat location of said user;
   g) said user choosing a category of vendor based upon category of goods sold by said category of vendor and, vendor location, choosing a vendor (the chosen vendor) selling goods in a desired category of goods, said chosen vendor being a vendor closest to said user seat location of all vendors selling said desired category of goods, ordering goods in an order from said chosen vendor, and said chosen vendor fulfilling said order and causing said goods to be delivered to said user at their seat location.

2. The method of claim 1, wherein said identifying information includes address of said user.

3. The method of claim 1, wherein said vendors have goods for sale chosen from the group consisting of one or more of food, beverages, souvenirs, and memorabilia.

4. The method of claim 3, wherein said beverages include alcoholic and non-alcoholic beverages.

5. The method of claim 1, wherein a processed order is wirelessly transmitted to a said point of service device.

6. The method of claim 2, wherein said manner of payment information includes information chosen from the group consisting of credit card information and debit card information.

7. The method of claim 1, wherein payment may include the step of providing a tip after goods have been delivered to a user.

8. The method of claim 1, wherein said delivery service comprises a person prompted by said point of service device to deliver purchased goods.

9. The method of claim 1, wherein said method is conducted in an entertainment venue comprising an arena where entertainment is taking place.

10. The method of claim 9, wherein said entertainment is chosen from the group consisting of one or more of a sporting event, musical concert, play, musical, and vehicle-related event.

11. The method of claim 1, wherein a plurality of users practice said method.

12. A method of improving efficiency of arena concessions, including the steps of:
   a) providing a computer software application (APP) downloadable onto communication modules comprising smartphones, said APP facilitating registering plural users with identifying information for each said user including name, contact information, manner of payment information, and an image of said user, and permitting said users to conveniently order goods from one or more of a plurality of vendors and have them delivered to user locations within an entertainment venue;
   b) providing a central processing server in said venue programmed to receive orders from said users which include user seat location within said entertainment venue, and process said orders from said vendors in or adjacent said entertainment venue, said central processing server including a wireless receiver for receiving orders, and a computer with a memory for saving and processing orders;
   c) providing a point of service device at a location of each said vendor, said point of service devices receiving orders from said central processing server and instructing said vendors to process said orders;
   d) providing a delivery service to deliver completed orders to said users; and
   e) facilitating electronic payment to said vendors for goods purchased by said users;

(f) a user activating a said smartphone which generates a list of vendors in the venue including identifying categories of vendors and within each category relative proximity of said vendors to said seat location of said user;

(g) said user choosing a category of vendor based upon category of goods sold by said category of vendor and, vendor location, choosing a vendor (the chosen vendor) selling goods in a desired category of goods, said chosen vendor being a vendor closest to said user seat location of all vendors selling said desired category of goods, ordering goods in an order from said chosen vendor, and said chosen vendor fulfilling said order and causing said goods to be delivered to said user at their seat location.

13. The method of claim 12, wherein said identifying information includes address of each user.

14. The method of claim 12, wherein said vendors have goods for sale chosen from the group consisting of one or more of food, beverages, souvenirs, and memorabilia.

15. The method of claim 12, wherein said central processing server includes a wireless receiver for receiving orders, and a computer with a memory for saving and processing orders, processed orders being wirelessly transmitted to said point of service devices.

* * * * *